(12) United States Patent
Ruckman (10) Patent No.: US 9,599,278 B2
(45) Date of Patent: Mar. 21, 2017

(54) ADJUSTABLE SUPPORT

(71) Applicant: Marc Ruckman, Fredonia, NY (US)

(72) Inventor: Marc Ruckman, Fredonia, NY (US)

( * ) Notice: Subject to any disclaimer, the term of this patent is extended or adjusted under 35 U.S.C. 154(b) by 0 days.

(21) Appl. No.: 14/329,266

(22) Filed: Jul. 11, 2014

(65) Prior Publication Data
US 2016/0010790 A1    Jan. 14, 2016

(51) Int. Cl.
| | |
|---|---|
| *F16M 11/26* | (2006.01) |
| *A47L 3/00* | (2006.01) |
| *E05C 17/12* | (2006.01) |
| *E04G 1/32* | (2006.01) |
| *E06B 3/50* | (2006.01) |
| *E04F 21/18* | (2006.01) |
| *F24F 13/32* | (2006.01) |
| *A47L 1/03* | (2006.01) |

(Continued)

(52) U.S. Cl.
CPC .............. *F16M 11/26* (2013.01); *A47L 1/03* (2013.01); *A47L 3/00* (2013.01); *B65G 21/2045* (2013.01); *E04F 21/1805* (2013.01); *E04F 21/1822* (2013.01); *E04F 21/1855* (2013.01); *E04F 21/1861* (2013.01); *E04F 21/1866* (2013.01); *E04F 21/1872* (2013.01); *E04F 21/1877* (2013.01); *E04F 21/1883* (2013.01); *E04F 21/1894* (2013.01); *E04G 1/08* (2013.01); *E04G 1/32* (2013.01); *E05C 17/047* (2013.01); *E05C 17/12* (2013.01); *E05C 17/30* (2013.01); *E06B 3/5063* (2013.01); *F24F 13/32* (2013.01)

(58) Field of Classification Search
CPC ... F24F 13/32; E04G 1/05; E04G 1/32; E04G 1/08; A47L 1/03; E05C 17/30; E05C 17/12; E05C 17/047; E06B 3/5063; E04F 21/1805; E04F 21/1822; E04F 21/1861; E04F 21/1855; E04F 21/1866; E04F 21/1872; E04F 21/1877; E04F 21/1883; E04F 21/1888; E04F 21/1894; B65G 21/2045; F16M 11/26
USPC ...... 248/161, 354.1, 371, 519, 180.1, 183.2, 248/178.1, 357, 351; 52/127.2; 454/204; D8/71
See application file for complete search history.

(56) References Cited

U.S. PATENT DOCUMENTS

| | | | |
|---|---|---|---|
| 70,467 | A | 11/1867 | Phelps |
| 541,653 | A | 6/1895 | Bobrick |

(Continued)

FOREIGN PATENT DOCUMENTS

| | | | | |
|---|---|---|---|---|
| DE | 19828037 A1 | * | 1/1999 | .......... E04F 21/1816 |
| DE | 20109856 U1 | * | 3/2002 | .......... E04F 21/1805 |

(Continued)

*Primary Examiner* — Eret McNichols
(74) *Attorney, Agent, or Firm* — Simpson & Simpson, PLLC (57) ABSTRACT

An adjustable support, comprising a base, a first tubular member extending upwardly from the base, the first tubular member comprising a first friction lock, a second tubular member arranged in telescoping engagement with the first tubular member, the second tubular member comprising a second friction lock and, a non-abrasive transverse member pivotably arranged on the second tubular member, wherein the first friction lock telescopingly secures the second tubular member within the first tubular member and the second friction lock pivotably secures the transverse member to the second tubular member.

15 Claims, 7 Drawing Sheets

(51) Int. Cl.
*B65G 21/20* (2006.01)
*E05C 17/04* (2006.01)
*E04G 1/08* (2006.01)
*E05C 17/30* (2006.01)

(56) References Cited

U.S. PATENT DOCUMENTS

| | | | |
|---|---|---|---|
| 545,438 A | 9/1895 | Allen | |
| 817,741 A * | 4/1906 | Armstrong | A47F 5/0892 |
| | | | 294/211 |
| 1,199,770 A * | 10/1916 | Elphinstone | F16M 11/20 |
| | | | 248/161 |
| 1,401,554 A | 12/1921 | Phillips | |
| 1,685,445 A | 9/1928 | Bash | |
| 2,358,865 A * | 9/1944 | McPherson | E04F 21/1805 |
| | | | 248/188.7 |
| 2,376,716 A | 5/1945 | Odin | |
| 2,472,654 A * | 6/1949 | Engelke | 248/49 |
| 2,560,467 A * | 7/1951 | Moore | 62/262 |
| 2,907,598 A * | 10/1959 | Hart | 403/112 |
| 2,983,474 A * | 5/1961 | Hanna | C08F 18/12 |
| | | | 248/161 |
| 3,168,286 A * | 2/1965 | Rickert | B25H 1/00 |
| | | | 248/187.1 |
| 3,600,855 A | 8/1971 | Starck et al. | |
| 3,734,441 A * | 5/1973 | Lux | 248/354.1 |
| 3,953,029 A * | 4/1976 | Boyd | 473/575 |
| 4,120,484 A * | 10/1978 | Zimmer | E04F 21/1811 |
| | | | 254/6 C |
| 4,261,607 A * | 4/1981 | Pilcher | B25B 27/14 |
| | | | 294/182 |
| 4,300,751 A * | 11/1981 | Delaney | B66F 19/00 |
| | | | 254/2 R |
| 4,520,981 A * | 6/1985 | Harrigan | F16M 11/28 |
| | | | 248/161 |
| 4,560,031 A * | 12/1985 | Dixon | E04F 21/1811 |
| | | | 182/115 |
| 4,600,348 A * | 7/1986 | Pettit | E04F 21/1822 |
| | | | 254/3 C |
| D293,052 S * | 12/1987 | Handler et al. | D6/681.3 |
| 4,733,844 A * | 3/1988 | Molloy | E04F 21/1805 |
| | | | 248/354.1 |
| 4,763,865 A * | 8/1988 | Danner | 248/164 |
| 5,129,774 A * | 7/1992 | Balseiro | E04F 21/1805 |
| | | | 248/354.1 |
| 5,154,381 A * | 10/1992 | Malinao | F16M 11/00 |
| | | | 248/121 |
| D338,820 S * | 8/1993 | Sheftel | D8/71 |
| 5,322,403 A * | 6/1994 | Herde | E04F 21/1822 |
| | | | 248/354.1 |
| 5,337,875 A * | 8/1994 | Lee | 193/35 R |
| 5,435,411 A * | 7/1995 | Borgatti | 182/181.1 |
| 5,445,352 A * | 8/1995 | Long | B66F 3/00 |
| | | | 248/188.5 |
| 5,566,511 A | 10/1996 | Van Drimmelen | |
| 5,622,009 A | 4/1997 | Healey | |
| 5,709,164 A * | 1/1998 | Batterton | 119/28.5 |
| 5,743,505 A * | 4/1998 | Sofy | 248/346.01 |
| 5,927,664 A * | 7/1999 | Schmidt | 248/176.1 |
| 5,979,854 A | 11/1999 | Lundgren et al. | |
| 6,161,605 A * | 12/2000 | Pena | 160/90 |
| 6,176,063 B1 * | 1/2001 | Warin | E04F 21/1811 |
| | | | 52/749.1 |
| D439,820 S * | 4/2001 | Yang | D8/71 |
| D440,370 S * | 4/2001 | Keshishian | D34/23 |
| 6,244,810 B1 | 6/2001 | Reyes | |
| 6,273,662 B1 * | 8/2001 | Fleckenstein | F16M 11/10 |
| | | | 248/371 |
| 6,349,497 B1 | 2/2002 | Roddenbery | |
| 6,481,365 B1 * | 11/2002 | Currie | B64F 1/16 |
| | | | 116/67 R |
| 6,508,448 B1 | 1/2003 | Stewart | |
| 6,663,060 B1 * | 12/2003 | Gifford, Sr. | 248/161 |
| D485,742 S * | 1/2004 | Heberle | D8/354 |
| 6,988,719 B2 * | 1/2006 | Ursell | B23Q 3/105 |
| | | | 248/269 |
| 7,101,136 B1 * | 9/2006 | Ray | B66F 11/044 |
| | | | 414/10 |
| 7,152,833 B1 * | 12/2006 | Pitsenbarger | A47B 97/00 |
| | | | 248/161 |
| 7,182,302 B2 * | 2/2007 | Noniewicz | 248/164 |
| 7,240,886 B2 * | 7/2007 | Jones | B23Q 3/186 |
| | | | 248/161 |
| 7,494,312 B2 * | 2/2009 | Valette | E04F 21/1822 |
| | | | 280/79.7 |
| 7,717,837 B2 * | 5/2010 | Florczak | 482/143 |
| 7,784,749 B2 * | 8/2010 | Radermacher | 248/161 |
| 8,157,306 B1 * | 4/2012 | Guerin | E04F 21/1805 |
| | | | 294/209 |
| 8,196,877 B2 * | 6/2012 | Gridley | E04F 21/1805 |
| | | | 248/160 |
| 8,336,835 B1 * | 12/2012 | Benner et al. | 248/200.1 |
| 8,469,427 B1 * | 6/2013 | Mejia | B66F 19/00 |
| | | | 294/209 |
| 8,480,058 B2 * | 7/2013 | Matthews | E04F 21/1894 |
| | | | 254/120 |
| 2002/0158177 A1 * | 10/2002 | Hill | 248/354.5 |
| 2004/0051011 A1 * | 3/2004 | Degen | 248/166 |
| 2004/0065799 A1 * | 4/2004 | Whittemore | E04G 21/243 |
| | | | 248/354.1 |
| 2004/0256525 A1 * | 12/2004 | Noniewicz | 248/164 |
| 2006/0016945 A1 * | 1/2006 | Taylor | 248/188.5 |
| 2006/0186284 A1 * | 8/2006 | Root | 248/161 |
| 2007/0145202 A1 * | 6/2007 | Hsieh | 248/161 |
| 2007/0206178 A1 * | 9/2007 | Chiang | A63B 24/00 |
| | | | 356/28 |
| 2009/0205257 A1 * | 8/2009 | Winner et al. | 49/161 |
| 2009/0250565 A1 * | 10/2009 | Jaggers et al. | 248/125.8 |
| 2010/0096529 A1 | 4/2010 | Kritsky | |
| 2010/0155548 A1 * | 6/2010 | Gumm | 248/161 |
| 2013/0112832 A1 * | 5/2013 | Hilton | A47C 21/028 |
| | | | 248/354.1 |
| 2015/0219272 A1 * | 8/2015 | Miller | B23P 19/04 |
| | | | 248/405 |
| 2016/0088748 A1 * | 3/2016 | Lin | H05K 5/0204 |
| | | | 248/371 |

FOREIGN PATENT DOCUMENTS

| | | | | |
|---|---|---|---|---|
| DE | 19927048 C2 * | 12/2003 | | E04F 21/1888 |
| FR | 2538437 A1 * | 6/1984 | | E04F 21/1811 |
| FR | 2741901 A1 * | 6/1997 | | E04F 21/1811 |
| FR | 2907939 A1 * | 8/2015 | | E04F 21/1805 |

* cited by examiner

Prior Art

ADJUSTABLE SUPPORT

FIELD OF THE INVENTION

The invention relates generally to an adjustable support, and, more specifically, to an adjustable support for double hung windows, and, even more specifically, to an adjustable support for double hung windows to accommodate cleaning of double hung windows without the use of a user's arm or an object which could damage the window.

BACKGROUND OF THE INVENTION

Double hung windows are used in both commercial and residential applications since they offer the ability to open the top sash and bottom sash of the window, rather than just the bottom sash when compared to a single hung window. This ability to open both sashes gives a homeowner the ability to ventilate his home in a variety of ways, depending on the surrounding environment. Additionally, both sashes within double hung windows can be hinged on a single side to allow for the glass to be tilted, allowing for better ventilation and air flow. An added feature of this tilting ability is that a homeowner is now able to thoroughly clean the exterior of the window from the inside of his home instead of having to wash the window from the exterior. Without a double hung window, washing the exterior surface can be a difficult task for homeowners with windows higher than the ground level. Homeowners are able to tilt the glass inward and clean each side of both panes of glass without needing special equipment or a professional cleaning company to do the task for them.

Figure 1:
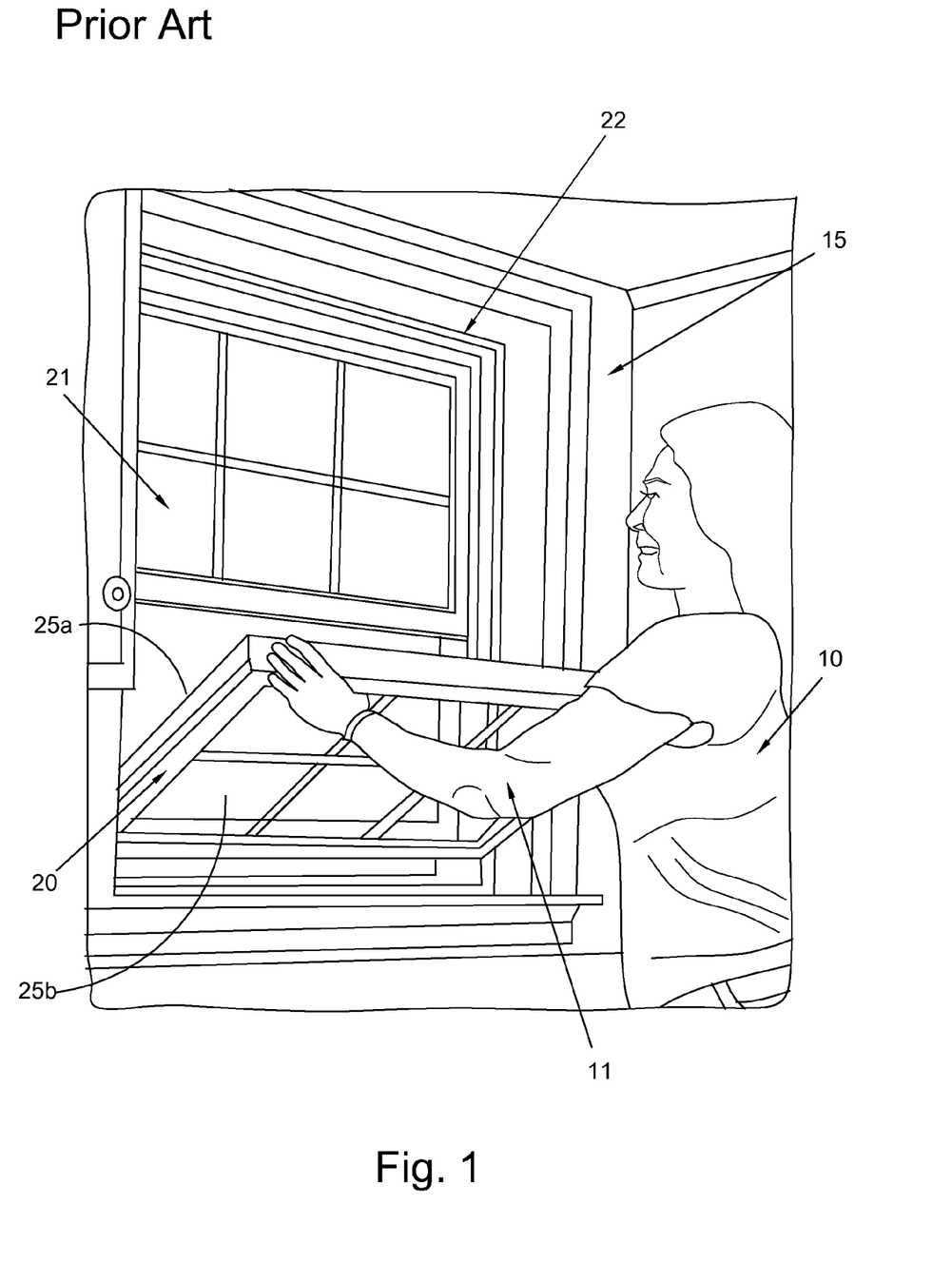
FIG. 1 is a perspective view of a typical double hung window 15.

FIG. 1 is a perspective view of a typical double hung window 15 being opened by user 10. Double hung window 15 comprises frame 22, bottom pane 20, top pane 21, exterior surface 25a, and interior surface 25b. Bottom pane 20 is secured to frame 22 via a hinge to allow for the tilting of bottom pane 20. This tilting action allows user 10 to thoroughly clean exterior surface 25a from inside. In order to prevent damage to the hinged connection between frame 22 and bottom pane 20, user 10 must support bottom pane 20 with her arm 11 or use some device which could damage window 15 to be positioned under bottom pane 20 to ensure excessive torque is not placed on the hinged connection. Excessive torque could occur while user 10 uses a cloth or cleaning medium to wipe exterior surface 25a of bottom pane 20, leading to a fracture in both frame 22 and bottom pane 20 along the hinged connection. In order to give user 10 use of both arms to clean with and to prevent fatigue, a device can be used to support bottom pane 20 of window 15. This device must be adjustable in order to accommodate a plurality of window heights since the exact height of a window is at the discretion of a homeowner at the time of construction and installation.

One embodiment of an adjustable support is disclosed in U.S. Pat. No. 6,508,448 (Stewart) which discloses an adjustable drywall support used to place pressure on panels of drywall. The support comprises a first tubular member, second tubular member, tubular cross member, first extension member, second extension member, and a fastening member. The second tubular member is telescopingly engaged within the first tubular member and is secured at various positions by the fastening member. Stewart fails to disclose a cross member which is secured to a second tubular member that pivots with respect to the second tubular member. Instead, Stewart teaches a cross member which is fixedly secured to a second tubular member in perpendicular arrangement.

Another embodiment of an adjustable support is disclosed in U.S. Pat. No. 5,979,854 (Lundgren et al.) which discloses a strut apparatus for holding drywall panels in position. The strut apparatus comprises a first tubular member, second tubular member, tubular cross member, and a screw jack. The second tubular member is telescopingly engaged within the first tubular member with a pin securing the second tubular member in position with respect to the first tubular member. The tubular cross member further includes a pivot stem and pivot pin which secures the tubular cross member to the second tubular member, allowing the second tubular member to pivot with respect to the tubular cross member. Lundgren et al. fail to disclose a means for securing the tubular cross member in a fixed position with respect to the second tubular member. Lundgren et al. also fail to disclose a means for securing the second tubular member with respect to the first tubular member in a plurality of positions not determined by predrilled holes positioned within the first tubular member and second tubular member.

Yet another embodiment of an adjustable support is disclosed in United States Application Publication No. 2010/0096529 (Kritsky) which discloses a stand for supporting a double hung window which comprises a base, outer tube, inner tube, and a supporter. A spring-loaded-push button is operatively arranged within the inner tube and a plurality of holes is arranged on the outer tube. The inner tube is telescopingly arranged within the outer tube and secured at various positions due to the interaction between the spring-loaded-push button and the plurality of holes. Kritsky fails to disclose a cross member which can pivot with respect to the inner tube and instead is secured to the inner tube in perpendicular arrangement. Kritsky also fails to disclose a means for securing the inner tube with respect to the outer tube in a plurality of positions not determined by a plurality of holes arranged on the outer tube.

Thus, there exists a long felt need for an adjustable device to support planar objects that includes a cross member which can pivot with respect to a support member and also allows the support member to be extended and secured in a plurality of positions.

BRIEF SUMMARY OF THE INVENTION

The present invention broadly includes an adjustable support, comprising a base, a first tubular member extending upwardly from the base, the first tubular member comprising a first friction lock, a second tubular member arranged in telescoping engagement with the first tubular member, the second tubular member comprising a second friction lock and, a non-abrasive transverse member pivotably arranged on the second tubular member, wherein the first friction lock telescopingly secures the second tubular member within the first tubular member and the second friction lock pivotably secures the transverse member to the second tubular member.

The present invention also comprises an adjustable support, comprising a base, a first tubular member extending upwardly from the base, the first tubular member comprising a first locking means, a second tubular member arranged in telescoping engagement with the first tubular member, the second tubular member comprising a second locking means and, a transverse member pivotably arranged on the second tubular member, wherein the first locking means telescopingly secures the second tubular member within the first tubular member and the second locking means pivotably secures the transverse member to the second tubular member.

The present invention further comprises an adjustable support, comprising a base, a first member extending upwardly from the base, the first member comprising a first locking means, a second member arranged in telescoping engagement with the first member, the second member comprising a second locking means and, a transverse member pivotably arranged on the second member, wherein the first locking means telescopingly secures the second member within the first member and the second locking means pivotably secures the transverse member to the second member.

A general object of the invention is to provide an adjustable support for double hung windows such that a user can use both hands in the cleaning process of the window.

A further object of the invention is to provide an adjustable support for double hung windows which can be positioned at a plurality of positions.

These and other objects, features and advantages of the present invention will become readily apparent upon a reading and review of the following detailed description of the invention, in view of the appended drawings and claims.

BRIEF DESCRIPTION OF THE DRAWINGS

The nature and mode of operation of the present invention will now be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention as claimed.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention.

Figure 2:
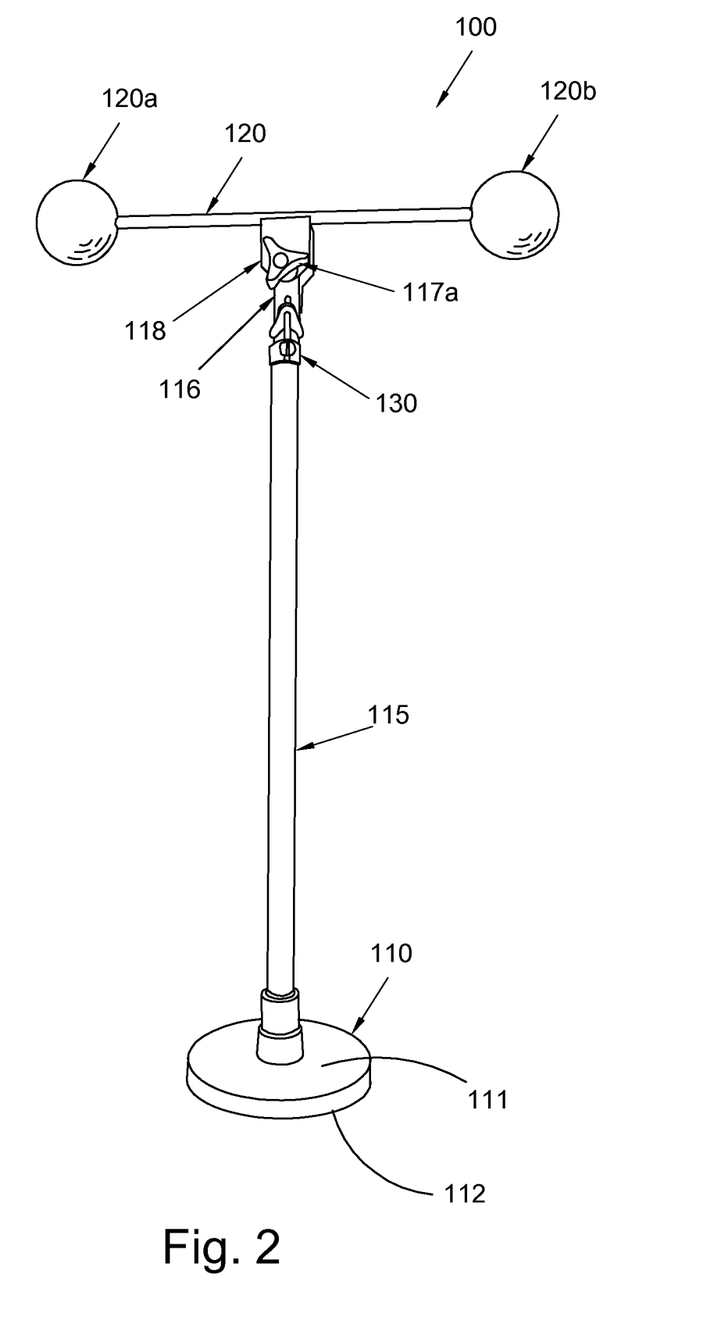
FIG. 2 is a perspective view of adjustable support 100 of the present invention.

Adverting now to the figures, FIG. 2 is a perspective view of adjustable support 100 which broadly comprises base 110, first member 115, second member 116, bolt 117a, screw 117b (shown in FIG. 3), transverse member 120, bracket 118, end member 120a, end member 120b, and lock 130. Base 110 further comprises top 111 and bottom 112, with first member 115 extending upwardly from and securing to top 111 of base 110 in perpendicular arrangement. In a preferred embodiment, base 110 is of a circular design to ensure stability of adjustable support 100 in any direction. It should be appreciated, however, that the use of different types of bases is possible and considered to be within the scope of the invention as claimed. For example, base 110 could be of a rectangular design or have the addition of diagonal support members. Lock 130 is arranged on first member 115 in order to secure second member 116 in a plurality of positions while in telescoping engagement with first member 115. Bolt 117a and nut 117b (shown in FIG. 3) secure bracket 118 to second member 116 through aligned apertures within bracket 118 and second member 116. When bolt 117a and screw 117b are tightened a certain amount, a friction lock is formed between bracket 118 and second member 116 to pivotably secure transverse member 120. Transverse member 120 fixedly secures to second member 116 via screws 122a and 122b (shown in FIG. 3). Transverse member 120 further includes end member 120a and end member 120b. End members 120a and 120b are removably secured to opposite distal ends of transverse member 120. In a preferred embodiment, end members 120a and 120b or transverse member 120 are coated in a non-abrasive material such as polyurethane foam which would not damage a glass pane resting on end members 120a and 120b or transverse member 120. It should be appreciated, however, that the use of different types of non-abrasive materials is possible and considered to be within the scope of the invention as claimed.

Figure 3:
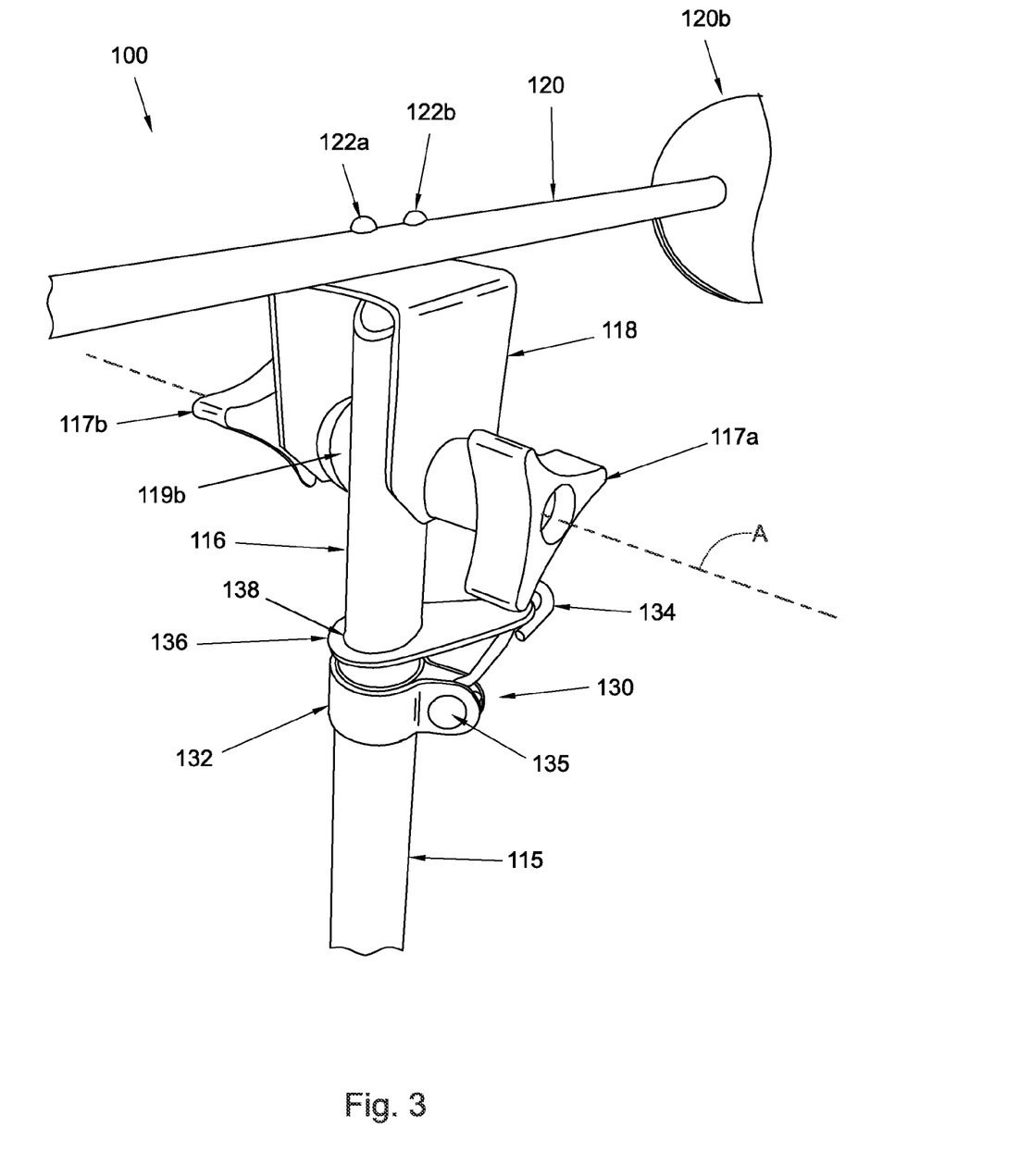
FIG. 3 is an enlarged perspective view of adjustable support 100.

FIG. 3 is an enlarged perspective view of adjustable support 100. As shown in the figure, screws 122a and 122b fixedly secure transverse member 120 to bracket 118. Bracket 118 secures to second member 116 via bolt 117a and nut 117b, which allows bracket 118 and transverse member 120 to pivot on axis A formed by bolt 117a and nut 117b, thereby changing the elevation of first end member 120a relative to the elevation of second end member 120b. Washers 119b and 119a (not shown) are arranged between bracket 118 and second member 116. Washers 119a and 119b are arranged on bolt 117a and allow for a compression fit between bracket 118 and second member 116. In a preferred embodiment, washers 119a and 119b are manufactured from rubber. It should be appreciated, however, that the use of different types of washers is possible and considered to be within the scope of the invention as claimed. For example, washers 119a and 119b can be nylon washers which can be compressed to form a compression fit between bracket 118 and second member 116.

Figure 4:
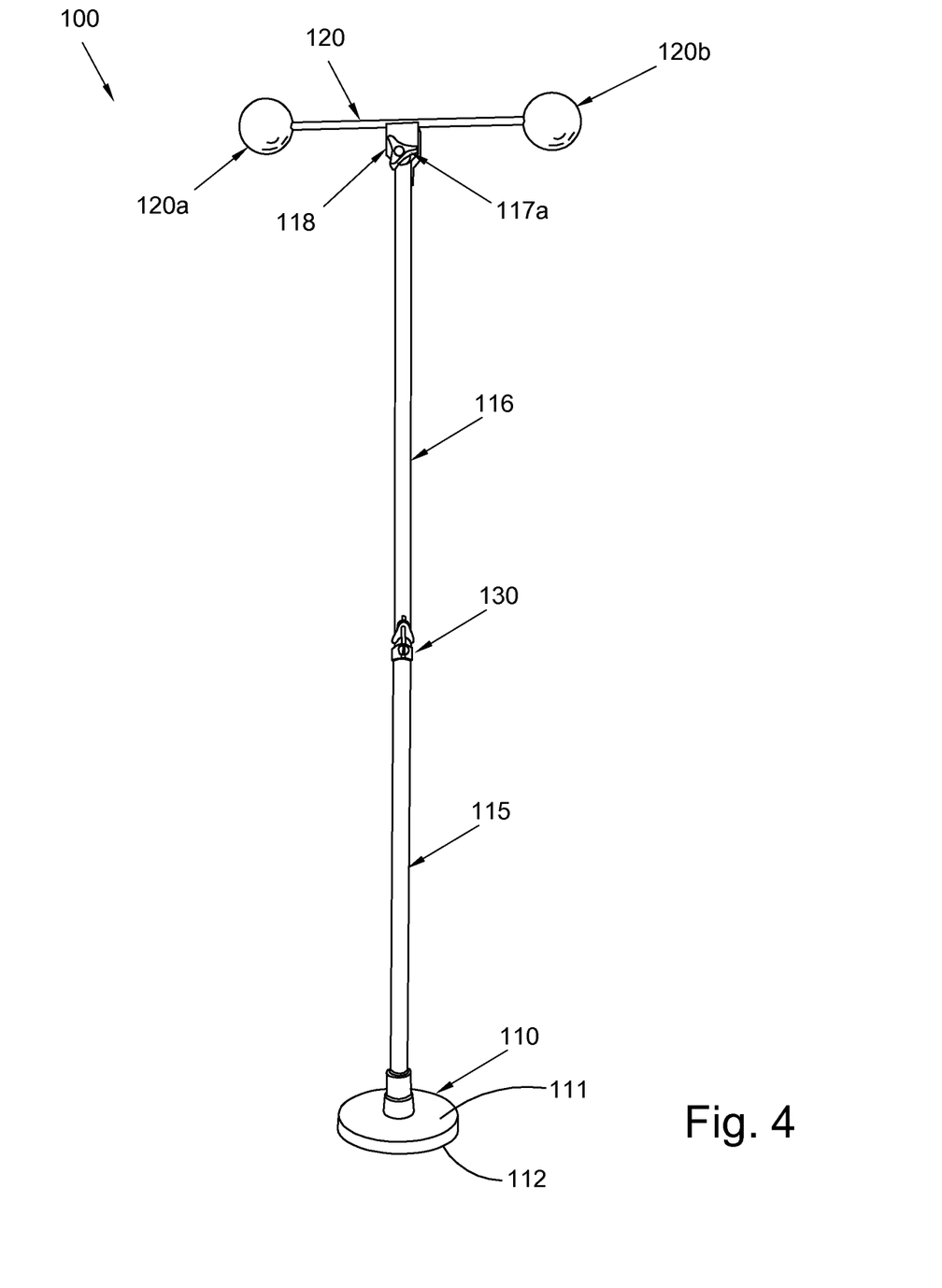
FIG. 4 is a perspective view of adjustable support 100 with second member 116 fully extended.

FIG. 4 is a perspective view of adjustable support 100 with second member 116 fully extended with respect to first member 115. In a preferred embodiment, the length of first member 115 is substantially similar to the length of second member 116 allowing for the second member 116 to be completely inserted into first member 115, minimizing the height of adjustable support 100 for storage while also maximizing the height of adjustable support 100 while second member 116 is fully extended. It should be appreciated, however, that different lengths for first member 115 and second member 116 are possible and considered to be within the scope of the invention as claimed.

Figure 5:
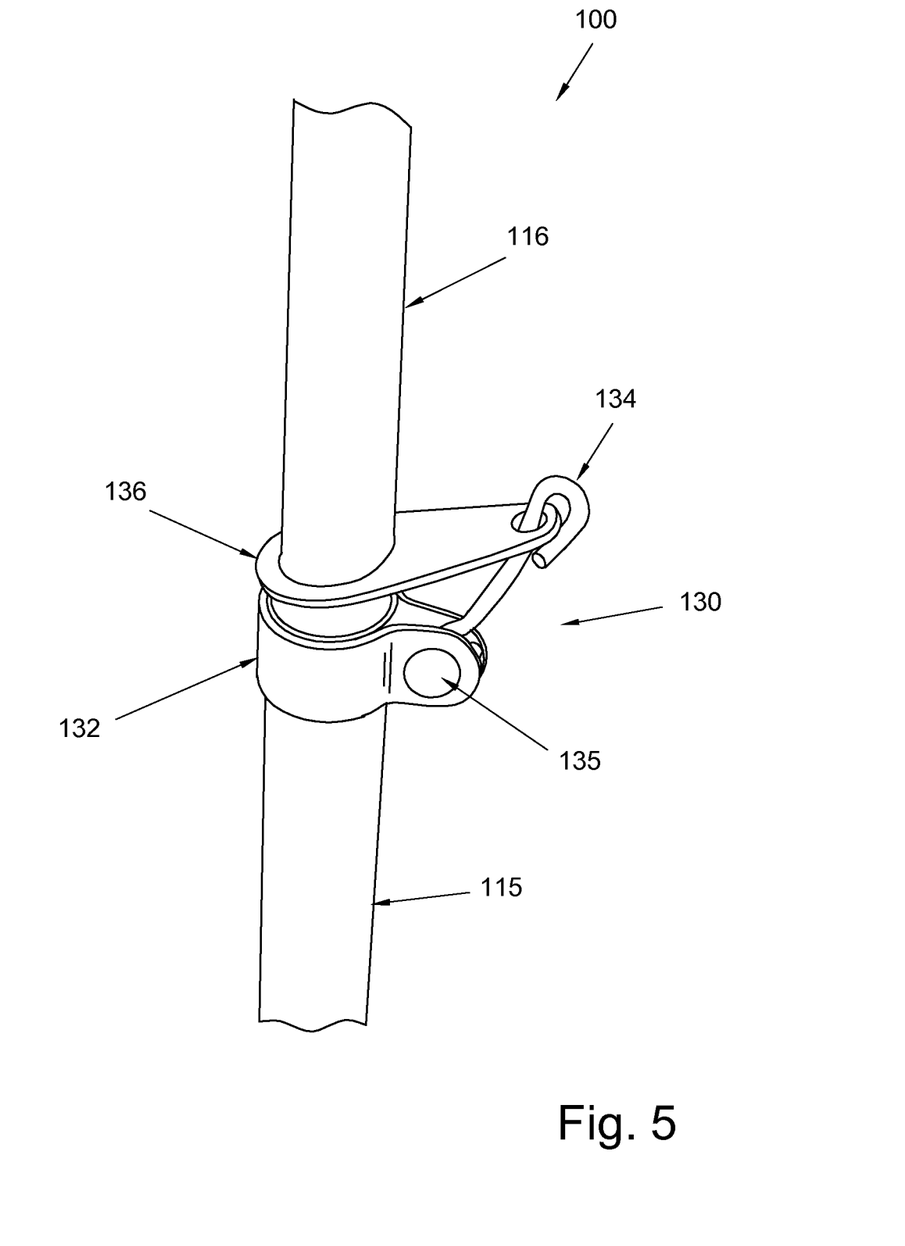
FIG. 5 is an enlarged perspective view of friction lock 130.

As shown in FIG. 5, lock 130 comprises bracket 132, member 134, rivet 135, and latch 136. Bracket 132 is fixedly secured to a distal end of first member 115, where second member 116 begins to telescopingly engage with first member 115. Member 134 is pivotably secured to bracket 132 by rivet 135 which allows member 134 and latch 136 to secure and release second member 116 in a plurality of positions with respect to first member 115. Second member 116 passes through aperture 138 of latch 136 which has a substantially similar cross section as second member 116. In a locked position, latch 136 is positioned close to bracket 132, which makes aperture 138 of latch 136 smaller than the cross section of second member 116. This engagement between latch 136 and second member 116 creates a friction lock which secures second member 116 at a certain position. In order to disengage the friction lock formed between latch 136 and second member 116, latch 136 is positioned away from bracket 136 which in turn makes aperture 138 larger than the cross section of second member 116. This allows second member 116 to telescopingly slide within first member 115 without any resistance from lock 130. In a preferred embodiment, lock 130 uses a friction lock to telescopingly secure second member 116 with first member 115. It should be appreciated, however, that the use of different types of locks is possible and considered to be within the scope of the invention as claimed. For example, second member 116 could comprise notches which correspond with tabs arranged on first member 115 or lock 130.

Figure 6:
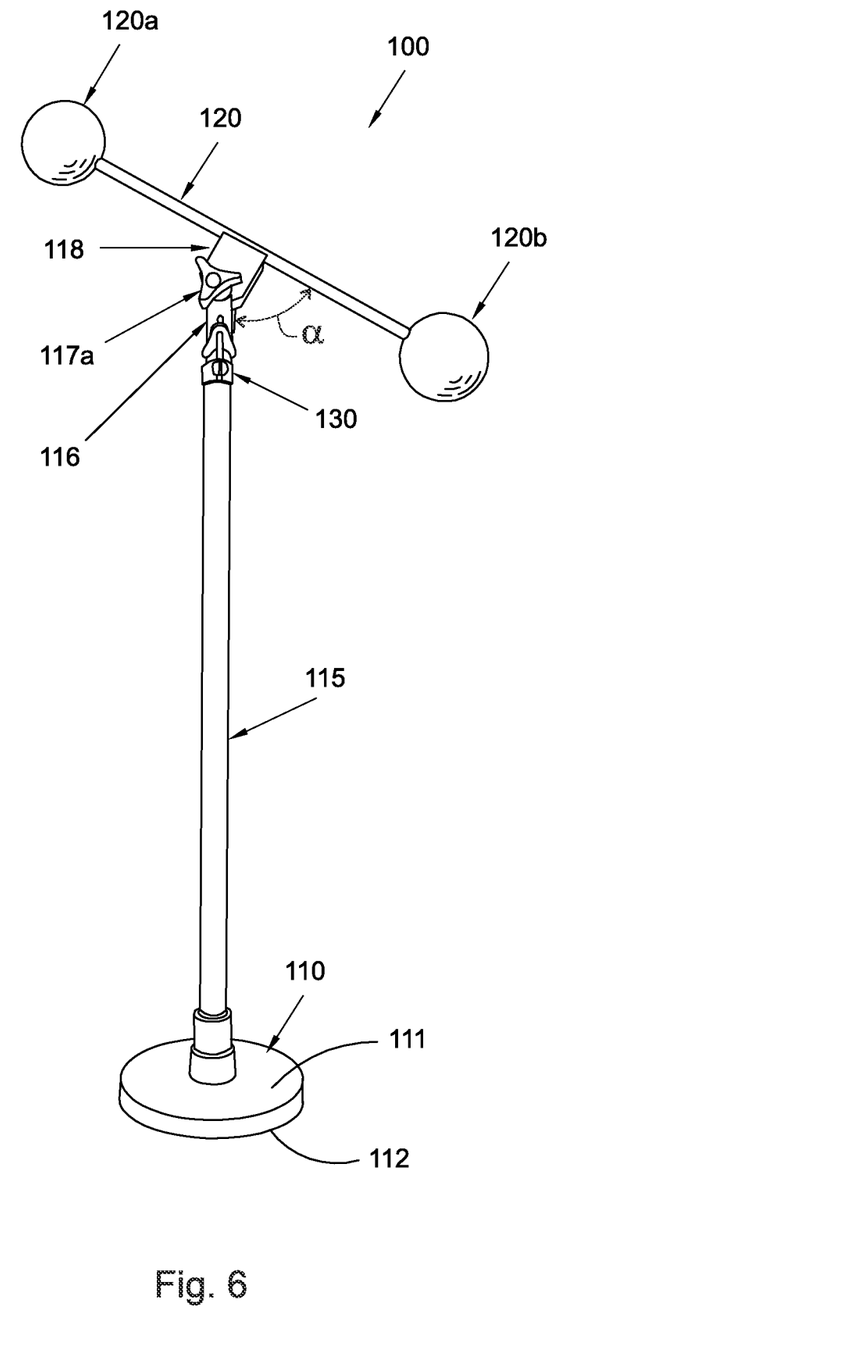
FIG. 6 is a perspective view of adjustable support 100 with cross member 120 angled with respect to first member 115; and, FIG. 7 is a perspective view of a typical double hung window 15 with adjustable support 100.

Since most windows are level to ensure a tight seal is achieved between frame 22 with top pane 21 and bottom pane 20 (shown in FIG. 1), transverse member 120 of adjustable support 110 is pivotably secured to second member 116, which enables transverse member 120 to pivot about axis A, which is formed by bolt 117a and nut 117b (shown in FIG. 3), to an angle α with respect to second member 116. This pivotable engagement between bracket 118 (which is fixedly secured to transverse member 120) and second member 116 is shown in FIG. 6 and ensures that equal pressure from bottom pane 20 is equally distributed between transverse member 120, end member 120a, and end member 120b when bottom pane 20 is engaged with adjustable support 100. Additionally, due to the pivotable engagement between bracket 118 and second member 116, adjustable support 100 can be positioned on uneven surfaces with respect to double hung window 15 (shown in FIG. 1) without placing excessive torque on the hinged connection of double hung window 15. Transverse member 120 simply pivots about axis A to an angle α, thereby changing the elevation of first end member 120a relative to the elevation of second end member 120b, in order to accommodate the uneven surface so that end members 120a and 120b still engage bottom pane 20 with equal pressure.

In a preferred embodiment, first member 115 and second member 116 are metal tubes in order to support the weight of bottom pane 20. It should be appreciated, however, that the use of different types of material for first member 115 and second member 116 is possible and considered to be within the scope of the invention as claimed. For example, first member 115 and second member 116 could be manufactured from a rigid plastic.

Figure 7:
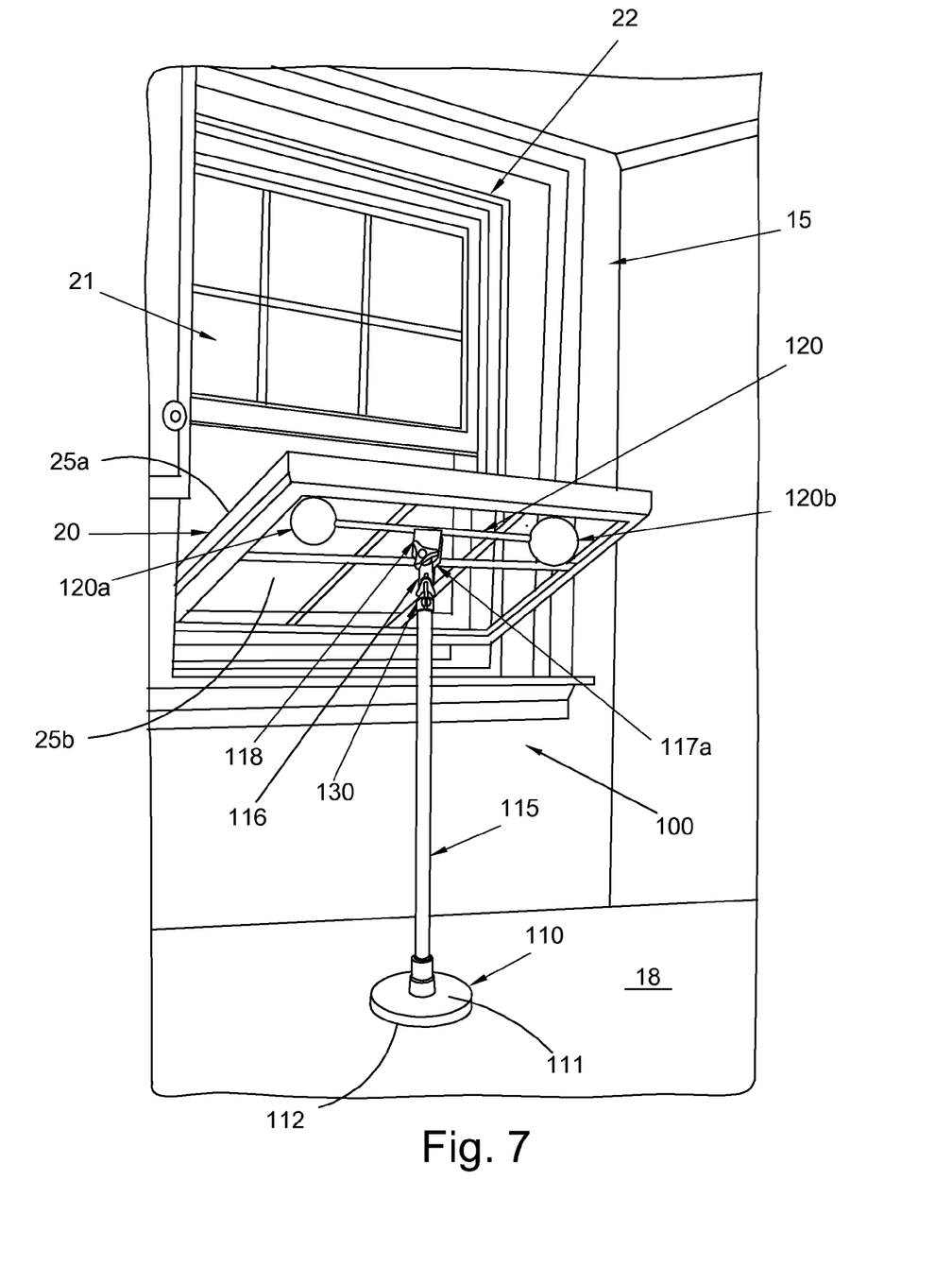

As shown in FIG. 7, adjustable support 100 supports bottom pane 20 of double hung window 15. Side 112 of base 110 rests on floor 18 while first member 115 extends upwardly towards double hung window 15. Depending on the height of double hung window 15 or a user, second member 116 can be extended to a certain position. Bottom pane 20 is unlocked and lowered to rest on adjustable support 100. End members 120a and 120b engage with interior surface 25b of bottom pane 20 and prevent bottom pane 20 from being lowered any further. Adjustable support 100 holds bottom pane 20 in place for cleaning, allowing a user to use both hands to clean the window and also eliminates potential residue left behind from a user's hand on interior surface 25b to support bottom pane 20 during cleaning. Additionally, adjustable support 100 can be used to support top pane 21 for cleaning by extending second member 116 to an appropriate height.

It will be appreciated that various features of the above-described invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 10 user
11 arm
15 double hung window
18 floor
20 bottom pane
21 top pane
22 frame
25a exterior surface
25b interior surface
100 adjustable support
110 base
111 top side
112 bottom side
115 first member
116 second member
117a bolt
117b nut
118 bracket
119a washer
119b washer
120 transverse member
120a end member
120b end member
122a screw
122b screw
130 lock
132 bracket
134 member
135 rivet
136 latch
138 aperture

What is claimed is:

1. An adjustable support, comprising:
a circular base having a first diameter;
a first tubular member extending upwardly from said base, said first tubular member having a second diameter, wherein said first diameter is larger than said second diameter and said first tubular member is perpendicularly and fixedly secured to said base;
a second tubular member having an outer surface and a through-bore, arranged in telescoping engagement with said first tubular member;

a transverse member bracket having a through-bore, pivotably arranged on said second tubular member;
a transverse member secured to said bracket;
a first spherical non-abrasive support member secured to a first end of said transverse member;
a second spherical non-abrasive support member secured to a second end of said transverse member;
wherein said first and second spherical non-abrasive support members each have an outer diameter, wherein each said outer diameter is the same, wherein said transverse member has an outer diameter, wherein said outer diameter of said first and second spherical non-abrasive support members is larger than said outer diameter of said transverse member, wherein an object having a planar surface supported by said first and second spherical non-abrasive support members will create an air gap between said planar surface and said transverse member between said first and second spherical non-abrasive support members;
a first friction lock configured to telescopingly secure said second tubular member within said first tubular member, said first friction lock interacting only with said outer surface of said second tubular member; and,
a second friction lock comprising a bolt and configured to pivotably secure said transverse member bracket to said second tubular member, said bolt of said second friction lock operatively arranged within said through-bore of said bracket and said through-bore of said second tubular member, said bolt operatively arranged to move axially perpendicular to said transverse member.

2. The adjustable support recited in claim 1, wherein said second friction lock further comprises a nut arranged on said bolt, said nut and bolt compressing said second tubular member with said transverse member.

3. The adjustable support recited in claim 1, wherein said first tubular member and said second tubular member are metal tubes.

4. An adjustable support, comprising:
a base comprising a continuously planar bottom surface and a first diameter;
a first tubular member comprising a second diameter, wherein said first diameter is larger than said second diameter and said first tubular member is perpendicularly and fixedly secured to said base, said first tubular member comprising a first locking means, said first locking means comprising a latch;
a second tubular member arranged in telescoping engagement with said first tubular member, said second tubular member comprising an outer surface, a through-bore, and a second locking means, said second locking means comprising a bolt;
a bracket having a through-bore, pivotably arranged on said second tubular member;
a transverse member comprising a first spherical non-abrasive end member positioned at a first elevation and a second spherical non-abrasive end member positioned at a second elevation, wherein the transverse member is secured to said bracket pivotably arranged on said second tubular member;
wherein said latch of said first locking means is operatively arranged to interact only with said outer surface of said second tubular member and telescopingly secures said second tubular member within said first tubular member, said bolt of said second locking means is operatively arranged within said through-bore of said bracket and said through-bore of said second tubular member, said bolt operatively arranged to move axially perpendicular to said transverse member, said second locking means pivotably secures said transverse member to said second tubular member, and when the transverse member pivots relative to the second tubular member, the first elevation changes relative to the second elevation.

5. The adjustable support as recited in claim 4, wherein said first locking means is a friction lock.

6. The adjustable support recited in claim 4, wherein said second locking means further comprises a nut arranged on said bolt, said nut and bolt compressing said second tubular member with said transverse member.

7. The adjustable support recited in claim 4, wherein said base is circular.

8. The adjustable support recited in claim 4, wherein said first tubular member and said second tubular member are metal tubes.

9. An adjustable support, comprising:
a base comprising a continuously planar bottom surface and a first diameter;
a first member extending upwardly from said base, said first member having a second diameter, wherein said first diameter is larger than said second diameter and said first member is perpendicularly and fixedly secured to said base, said first member comprising a first locking means, said first locking means comprising a latch;
a second member arranged in telescoping engagement with said first member, said second member comprising an outer surface, a through-bore, and a second locking means, said second locking means comprising a bolt;
a bracket having a through-bore, pivotably arranged on said second member;
a transverse member pivotably arranged on said second member bracket;
a first spherical non-abrasive support member secured to a first end of said transverse member;
a second spherical non-abrasive support member secured to a second end of said transverse member;
wherein said first and second spherical non-abrasive support members each have an outer diameter, wherein each said outer diameter is the same, wherein said transverse member has an outer diameter, wherein said outer diameter of said first and second spherical non-abrasive support members is larger than said outer diameter of said transverse member, wherein an object having a planar surface supported by said first and second spherical non-abrasive support members will create an air gap between said planar surface and said transverse member between said first and second spherical non-abrasive support members and, said latch of said first locking means is operatively arranged to interact only with said outer surface of said second member and telescopingly secures said second member within said first member, said bolt of said second locking means is operatively arranged within said through-bore of said bracket and said through-bore of said second member, said bolt operatively arranged to move axially perpendicular to said transverse member and pivotably secures said transverse member to said second member.

10. The adjustable support as recited in claim 9, wherein said first locking means is a friction lock.

11. The adjustable support recited in claim 9, wherein said second locking means further comprises a nut arranged on said bolt, said nut and bolt compressing said second member with said transverse member.

12. The adjustable support recited in claim 9, wherein said base is circular.

13. The adjustable support recited in claim 9, wherein said first member and said second member are metal tubes.

14. The adjustable support recited in claim 9, wherein said base is solid.

15. The adjustable support recited in claim 9, wherein said base is caster-less.

* * * * *